United States Patent
White et al.

(10) Patent No.: US 8,913,040 B2
(45) Date of Patent: Dec. 16, 2014

(54) DOWNSAMPLING DATA FOR CROSSTALK COMPENSATION

(75) Inventors: Kevin J. White, Los Gatos, CA (US); Marduke Yousefpor, San Jose, CA (US); Christoph Horst Krah, Los Altos, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 12/940,870

(22) Filed: Nov. 5, 2010

(65) Prior Publication Data

US 2012/0113064 A1 May 10, 2012

(51) Int. Cl.
*G06F 3/041* (2006.01)

(52) U.S. Cl.
CPC ............ *G06F 3/0412* (2013.01); *G06F 3/0418* (2013.01)
USPC ..... 345/178; 345/174; 178/18.01; 178/18.03; 178/18.06

(58) Field of Classification Search
CPC ... G06F 3/044; G06F 3/04883; G06F 3/0418; G06F 2203/04808; G06F 3/0412
USPC ....................... 345/178, 17, 104, 4, 173–175; 178/18.01–18.09
See application file for complete search history.

(56) References Cited

U.S. PATENT DOCUMENTS

| | | | |
|---|---|---|---|
| 5,053,757 A | 10/1991 | Meadows | |
| 5,289,548 A * | 2/1994 | Wilson et al. | 382/250 |
| 5,483,261 A | 1/1996 | Yasutake | |
| 5,488,204 A | 1/1996 | Mead et al. | |
| 5,798,740 A * | 8/1998 | Bitzakidis et al. | 345/92 |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,215,477 B1 * | 4/2001 | Morrison et al. | 345/173 |

(Continued)

FOREIGN PATENT DOCUMENTS

| | | |
|---|---|---|
| GB | 2 469 374 A | 10/2010 |
| JP | 2000-163031 A | 6/2000 |
| JP | 2002-342033 A | 11/2002 |
| WO | WO-2012/061180 A1 | 5/2012 |

OTHER PUBLICATIONS

International Search Report mailed Apr. 5, 2012, for PCT Application No. PCT/US2011/057934, filed Oct. 26, 2011, three pages.

(Continued)

*Primary Examiner* — Lun-Yi Lao
*Assistant Examiner* — Peter D McLoone
(74) *Attorney, Agent, or Firm* — Morrison & Foerster LLP

(57) ABSTRACT

A touch sensitive device having circuitry to compensate for crosstalk from the device display to the device touch sensor panel is disclosed. The crosstalk compensation circuitry can include a downsampler and a crosstalk compensator. The downsampler can downsample a display image to a manageable size for transmission and processing and can then send the downsampled image to the crosstalk compensator so as to provide information about the display operation that can be used to estimate the expected amount of crosstalk caused by the display. The crosstalk compensator can estimate the amount of crosstalk based on the downsampled image and can then compensate a touch image captured by the touch sensor panel for the estimated amount, the touch image being indicative of a touch or hover event at the panel.

18 Claims, 10 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,563,964 B1 * | 5/2003 | Hallberg ............... 382/299 |
| 6,624,800 B2 * | 9/2003 | Hughes et al. ............... 345/88 |
| 6,690,387 B2 | 2/2004 | Zimmerman et al. |
| 7,015,894 B2 | 3/2006 | Morohoshi |
| 7,076,108 B2 * | 7/2006 | Huang et al. ............... 382/240 |
| 7,184,064 B2 | 2/2007 | Zimmerman et al. |
| 7,522,883 B2 * | 4/2009 | Gebara et al. ............... 455/63.1 |
| 7,643,011 B2 | 1/2010 | O'Connor et al. |
| 7,663,607 B2 | 2/2010 | Hotelling et al. |
| 8,479,122 B2 | 7/2013 | Hotelling et al. |
| 8,537,126 B2 * | 9/2013 | Yousefpor et al. ............... 345/173 |
| 8,773,351 B2 * | 7/2014 | Rekimoto ............... 345/156 |
| 2002/0135568 A1 | 9/2002 | Chen |
| 2003/0108248 A1 * | 6/2003 | Huang et al. ............... 382/240 |
| 2004/0243747 A1 * | 12/2004 | Rekimoto ............... 710/72 |
| 2005/0175099 A1 * | 8/2005 | Sarkijarvi et al. ....... 375/240.16 |
| 2006/0026521 A1 | 2/2006 | Hotelling et al. |
| 2006/0097991 A1 * | 5/2006 | Hotelling et al. ............... 345/173 |
| 2006/0197753 A1 | 9/2006 | Hotelling |
| 2006/0227115 A1 | 10/2006 | Fry |
| 2007/0052690 A1 | 3/2007 | Roberts |
| 2008/0158169 A1 * | 7/2008 | O'Connor et al. ............... 345/173 |
| 2008/0231729 A1 * | 9/2008 | Sato et al. ............... 348/229.1 |
| 2010/0253638 A1 * | 10/2010 | Yousefpor et al. ............... 345/173 |
| 2010/0295824 A1 * | 11/2010 | Noguchi et al. ............... 345/175 |
| 2011/0074705 A1 * | 3/2011 | Yousefpor et al. ............... 345/173 |
| 2011/0096011 A1 | 4/2011 | Suzuki |
| 2011/0298727 A1 * | 12/2011 | Yousefpor et al. ............... 345/173 |
| 2012/0113064 A1 * | 5/2012 | White et al. ............... 345/178 |
| 2012/0182251 A1 * | 7/2012 | Krah ............... 345/174 |
| 2013/0076647 A1 * | 3/2013 | Yousefpor et al. ............... 345/173 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

DOWNSAMPLING DATA FOR CROSSTALK COMPENSATION

FIELD

This relates generally to touch sensitive devices and more particularly, to compensating for crosstalk between display and touch components in touch sensitive devices.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

The ability to recognize and interpret the touch or hover event can be compromised by crosstalk between the display device and the touch sensor panel. However, it can be challenging to substantially reduce or eliminate the crosstalk so that the touch sensitive device can perform touch and hover operations effectively and efficiently.

SUMMARY

This relates to a touch sensitive device having circuitry to compensate for crosstalk from the device display to the device touch sensor panel that can interfere with the panel's touch and hover sensing. The touch sensitive device's compensation circuitry can include a downsampler and a crosstalk compensator. The downsampler can downsample a display image to a manageable size for transmission and processing and can then send the downsampled image to the crosstalk compensator so as to provide information about the display operation that can be used to estimate the expected amount of crosstalk caused by the display. The crosstalk compensator can estimate the amount of crosstalk based on the downsampled image and can then compensate a touch image captured by the touch sensor panel for the estimated amount, the touch image being indicative of a touch or hover event at the panel. Crosstalk compensation circuitry can advantageously improve touch and hover sensing in the touch sensitive device by providing clearer, more accurate touch and hover events for processing.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to a touch sensitive device that can compensate for crosstalk in the device. The touch sensitive device can include a display for displaying graphics and/or text information, a touch sensor panel for sensing a touch or hover event at the panel, and circuitry for compensating for crosstalk from the display to the panel that could cause a false or erroneous touch or hover event at the panel. The compensation circuitry can include a downsampler and a crosstalk compensator. The downsampler can downsample a display image to a manageable size for transmission and processing and can then send the downsampled image to the crosstalk compensator so as to provide information about the display operation that can be used to estimate the amount of crosstalk caused by the display. The crosstalk compensator can estimate the amount of crosstalk based on the downsampled image and can then compensate a touch image captured by the touch sensor panel for the estimated amount, the touch image being indicative of a touch or hover event at the panel. Crosstalk compensation circuitry can advantageously improve touch and hover sensing in the touch sensitive device by providing clearer, more accurate touch and hover events for processing.

Figure 1:
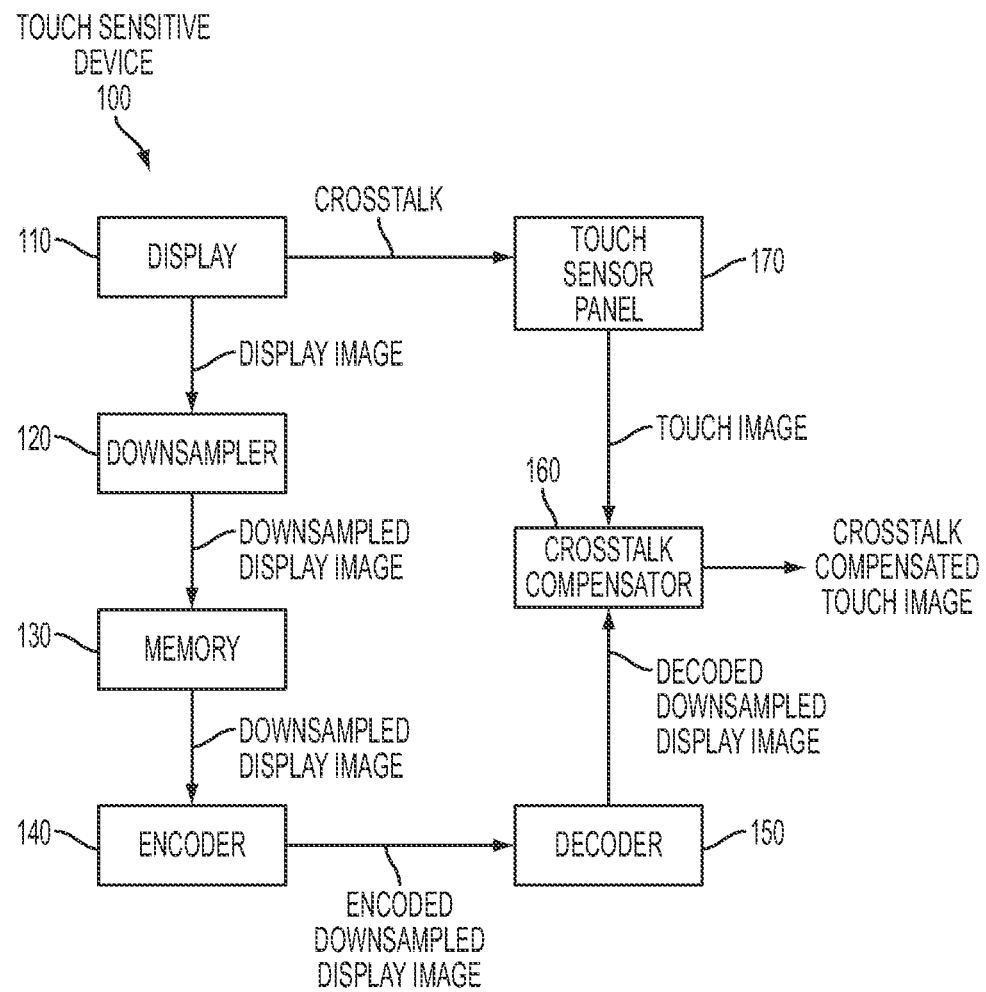
FIG. 1 illustrates an exemplary touch sensitive device having crosstalk compensation circuitry according to various embodiments.

FIG. 1 illustrates an exemplary touch sensitive device having crosstalk compensation circuitry according to various embodiments. In the example of FIG. 1, touch sensitive device 100 can include display 110 for displaying graphics and/or text information. The display 110 can include multiple display pixels to display the information. The display pixels can include red (R), green (G), and blue (B) subpixels, with the combination of all three R, G, and B subpixels forming a single color pixel. Each subpixel can include a thin film transistor (TFT) with gate, source, and drain, a storage capacitor, a liquid crystal capacitor, a color filter voltage source, a common voltage (Vcom) line, a data line, and a gate line. Other display technologies can also be employed. The gate line and the Vcom line can activate the subpixel components to display graphics and/or text data as a display image. The data line can carry the data signals to be displayed in the image.

The touch sensitive device 100 can also include touch sensor panel 170 for sensing an object touching and/or hovering over the panel. The panel 170 can include multiple touch pixels to sense the touching or hovering object. The touch pixels can be capacitive sensing nodes formed by drive and sense lines crossing over each other or located near each other. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. The drive lines can be driven by stimulation signals to generate touch signals in the sense lines indicative of a touch or hover at the touch pixels of the panel 170. After a touch or hover has been detected in the panel 170, the pattern of touch pixels in the panel 170 at which a touch or hover occurred can be thought of as an "image" of touch (e.g. a pattern of fingers touching or hovering over the panel).

In some embodiments, the touch pixels in the panel 170 can be formed into different groups of drive regions for driving the stimulation signals, guard regions for alleviating undesirable interactions from the display 110 and undesirable interactions between adjacent drive and sense regions, and sense regions for generating the touch signals indicative of the touch or hover at the panel. A guard region can be formed between a drive region and a sense region. Each drive region can include a single pixel, a group of pixels in a single row, or a matrix of pixels, i.e., a group of pixels in multiple adjacent rows and columns. The drive region can be driven by stimulation signals along the region's drive lines. Each sense region can include a single column of pixels or multiple columns of adjacent pixels. The sense region can generate touch signals indicative of the touch or hover at the panel 170 in response to stimulation of a proximate drive region in the panel and can transmit the touch signals along the region's sense lines. Each guard region can include a single column of pixels or multiple columns of adjacent pixels. The guard region can be connected to ground to alleviate undesirable interactions from the display 110 and between adjacent drive and sense regions. The drive lines can transmit stimulation signals to stimulate the drive regions to form electric field lines between the stimulated drive regions and adjacent sense regions. When an object touches or hovers over a stimulated drive region, the object can affect some of the electric field lines extending to the adjacent sense regions, thereby reducing the amount of charge coupled to these adjacent sense regions. This reduction in charge can be sensed by the sense regions as the "image" of touch.

During touch sensitive device operation, the display 110 and the touch sensor panel 170 can interact undesirably with each other to create crosstalk, in which display signals can capacitively couple with the panel to produce false or erroneous touch signals at the panel. Such touch signals can indicate either a false touch or hover event where there is no object touching or hovering over the panel, or an erroneous touch or hover event where the touching or hovering object is at a location and/or distance different from that indicated by the event. This can cause unintended action by the touch sensitive device 100.

To counter crosstalk effects, the touch sensitive device 100 can use downsampler 120 for gathering information about the display signals associated with the crosstalk and can use crosstalk compensator 160 for applying the gathered display signal information to touch signals to compensate for that crosstalk. The display signals can provide a display image having multiple pixel values of graphics and/or text information. The touch or hover event can be captured in a touch image having multiple pixel values of touch or hover information. Since the display image can have substantially more pixel values than the touch image, the display image can be downsampled by the downsampler 120 to provide display information of a magnitude comparable to the touch or hover information of the touch image so as to avoid bandwidth issues when transmitting and/or processing the downsampled display information over touch and hover circuitry. For example, the downsampler 120 can downsample a display image of about 1000 rows to a display image of about 20 rows comparable to a 20-row touch image. The display information can then be applied to the touch or hover information by the crosstalk compensator 160 to compensate for the crosstalk.

The touch sensitive device 100 can also include memory 130 for temporarily storing downsampled display information until such time that the information can be applied to touch information to compensate for crosstalk. The memory 130 can be main memory, random-access-memory, flash memory, portable memory, remote memory and the like.

The touch sensitive device 100 can optionally include encoder and/or transmitter 140 for encoding and transmitting the downsampled display information, and decoder and/or receiver 150 for receiving and decoding the display information. In some embodiments, the display circuitry and the touch circuitry can be distributed within the touch sensitive device such that transmission of information between the two circuits requires a transmitter and a receiver. In some alternate embodiments, the circuits can be integrated such that a transmitter and receiver need not be used. In some embodiments, the transmission media can have limited bandwidth such that the display information is compressed for transmission, requiring an encoder and a decoder. In some alternate embodiments, the transmission media can have sufficient bandwidth to easily transmit uncompressed information. It is to be understood that the encoder and/or transmitter and decoder and/or receiver are optional based on the capabilities of the touch sensitive device.

In operation, the touch sensitive device 100 can display graphics and/or text information in a display image on the display 110. As a result of interference, such as display parametric changes affected by the displayed information, electromagnetic noise from the display signals, and any other types of associated interference, the display 110 and the touch sensor panel 170 can have crosstalk. To compensate for the crosstalk, the downsampler 120 can receive the display image from the display 110 and downsample the image to a size comparable to that of a touch image (affected by the crosstalk) captured by the touch sensor panel 170. The memory 130 can temporarily store the downsampled image until such time that the touch sensor panel 170 captures a touch image that is to be compensated for any crosstalk therein. At such a time, the encoder 140 can encode the downsampled image from the memory 140 and transmit the encoded image to the decoder 150. The decoder can then decode the downsampled display image. The crosstalk compensator 160 can receive the crosstalk-affected touch image from the touch sensor panel 170 and the decoded downsampled display image from the decoder 150. The compensator 160 can then apply the downsampled display image to the touch image to compensate the touch image for the crosstalk. The compensator 160 can output a touch image with little or no crosstalk effects for further processing to trigger some associated action by the touch sensitive device 100.

The touch sensitive device 100 can switch between an active display mode, in which the display 110 provides a display image, and an active touch mode, in which the touch sensor panel 170 senses a touch or hover. During the display mode, the touch sensitive device 110 can downsample, store, encode, and decode the display image. During the touch mode, the touch sensitive device 110 can capture the touch image and crosstalk-compensate the touch image with the display image. Alternatively, during the touch mode, the touch sensitive device 110 can capture the touch image and, after transitioning back to the display mode from the touch mode while the device is downsampling, storing, encoding and decoding the next display image, the touch sensitive device can crosstalk-compensate the captured touch image with the display image.

In some embodiments, the touch sensor panel 170 and the display 110 can be separate components ("out cell" configuration). In some embodiments, the touch sensor panel 170 can form a layer of the display 110 ("on cell" configuration). In some embodiments, the touch sensor panel 170 and the display 110 can be integrated, where each pixel includes both touch sensors and display components ("in cell" configuration).

It is to be understood that the components and/or configuration of the touch sensitive device of FIG. 1 is not limited to that illustrated here, but can include additional and/or other components to compensate for crosstalk according to various embodiments.

Figure 2:
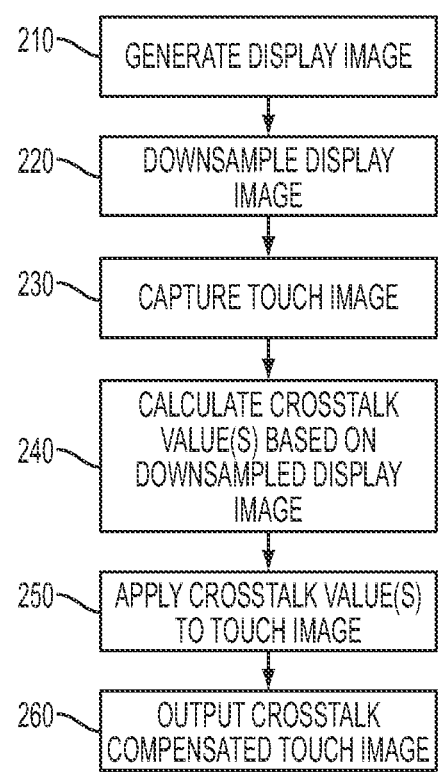
FIG. 2 illustrates an exemplary method of compensating for crosstalk in a touch sensitive device, such as in FIG. 1, according to various embodiments.

FIG. 2 illustrates an exemplary method of compensating for crosstalk in a touch sensitive device according to various embodiments. This method can be used in the touch sensitive device of FIG. 1, for example. In the example of FIG. 2, a display image can be generated at a display (210). The display image can be downsampled to a manageable transmission size, such as a size comparable to that of a touch image to be captured at an associated touch sensor panel (220). The touch image can subsequently be captured at a touch sensor panel (230). A crosstalk value or values indicative of the amount of crosstalk between the display and the touch sensor panel can be generated based on the downsampled display image (240). In some embodiments, the crosstalk value can be a crosstalk image in which each pixel of the image has a value representative of the amount of crosstalk to compensate for in the corresponding touch image pixel. In some embodiments, the crosstalk value can be multiple values representative of the amount of crosstalk to compensate for in corresponding regions of the touch image. In some embodiments, the crosstalk value can be a single value representative of the amount (aggregate or average) of crosstalk to compensate for in the entire touch image. The crosstalk value can be applied to the captured touch image (250). In some embodiments, the crosstalk value can be subtracted from the touch image values. In some embodiments, the crosstalk value can be added to the touch image values. In some embodiments, the crosstalk value as a scale factor can be multiplied by the touch image values. In some embodiments, the crosstalk value as a scale factor can be divided into the touch image values. The result can be outputted as a crosstalk-compensated touch image (260).

It is to be understood that the method of FIG. 2 is not limited to that illustrated here, but can include additional and/or other actions to compensate for crosstalk according to various embodiments.

Figure 3:
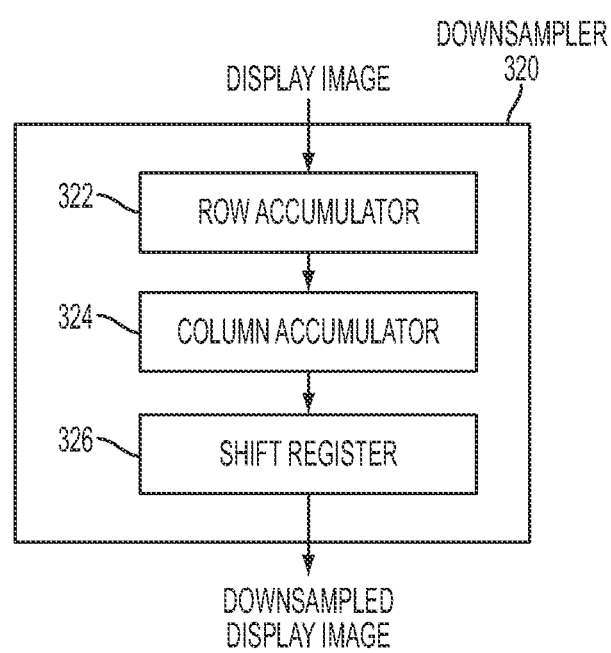
FIG. 3 illustrates an exemplary touch sensitive device downsampler having crosstalk compensation circuitry according to various embodiments.

FIG. 3 illustrates an exemplary display image downsampler of a touch sensitive device having crosstalk compensation circuitry according to various embodiments. In the example of FIG. 3, downsampler 320 of a touch sensitive device can downsample a display image to a manageable transmission size, such as a size comparable to that of a touch image captured by a touch sensor panel, in preparation for applying the downsampled image to the touch image to compensate for crosstalk between the touch sensitive device's display and touch sensor panel. For a particular touch sensitive device, the touch pixels in the touch sensor panel that experience crosstalk and the corresponding (e.g., proximate or closest) display pixels that cause the crosstalk can be identified prior to device operation based on known characteristics, behaviors, etc., of that touch sensitive device, for example. In some embodiments, these identified touch pixels can be most or all of the pixels in the panel. In some embodiments, these identified touch pixels can be certain pixels in particular locations of the panel. In some embodiments, these identified touch pixels can be pixels in adjacent drive and sense regions that are in closest proximity to each other because the stronger electric fields between these pixels can be most influenced by proximate display pixels. Accordingly, touch pixel values to be crosstalk-compensated and corresponding display pixels causing the crosstalk can be predetermined. Since the display pixels are more numerous than the touch pixels, multiple display pixels (e.g., a region of pixels forming several rows and columns) can correspond to a single touch pixel or a few touch pixels in a touch image row.

Figure 4:
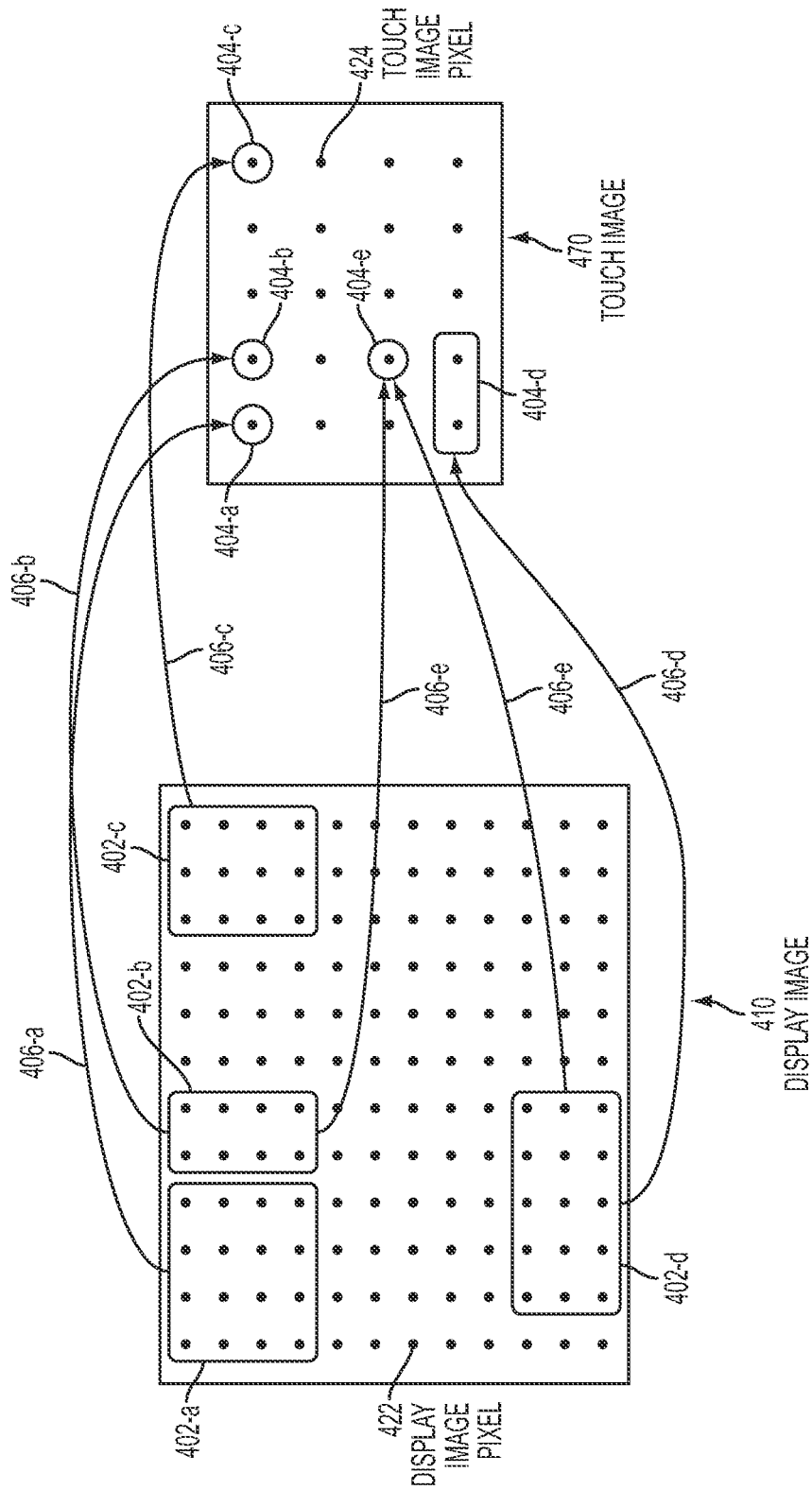
FIG. 4 illustrates an exemplary mapping between display pixels and touch pixels in a touch sensitive device for crosstalk compensation according to various embodiments.

FIG. 4 illustrates an example of this correspondence (or mapping) between display pixels and touch pixels in their respective display and touch images. In the example of FIG. 4, predetermined first region 402-*a* in display image 410 can include pixel values for 4 rows and 4 columns of display pixels 422. This region 402-*a* can correspond to predetermined first region 404-*a* in touch image 470 which can include a pixel value for one touch pixel 424 in the first row. The correspondence or mapping between the display region 402-*a* and the touch region 404-*a* is symbolically illustrated by arrow 406-*a*. Similarly, predetermined second region 402-*b* in the display image 410 can include pixel values for 4 rows and 2 columns of display pixels 422. This region 402-*b* can correspond to predetermined second region 404-*b* in the touch image 470 which can include a pixel value for one touch pixel 424 in the first row, and to predetermined fifth region 404-*e* in the touch image which can include a pixel value from one touch pixel in the third row. The correspondence or mapping between the display region 402-*b* and the touch region 404-*b* is symbolically illustrated by arrow 406-*b* and between the display region 402-*b* and the touch region 404-*e* by arrow 406-*e*. Predetermined third region 402-*c* in the display image 410 can include pixel values for 4 rows and 3 columns of display pixels 422. This region 402-*c* can correspond to predetermined third region 404-*c* in the touch image 470 which can include a pixel value for one touch pixel 424 in the first row. The correspondence or mapping between the display region 402-*c* and the touch region 404-*c* is symbolically illustrated by arrow 406-*c*. Also predetermined fourth region 402-*d* in the display image 410 can include pixel values for 3 rows and 5 columns of display pixels 422. This region 402-*d* can correspond to predetermined fourth region 404-*d* in the touch image 470 which can include pixel values for two touch pixels 424 in the last row, and to predetermined fifth region 404-*e* in the touch image which can include a pixel value from one touch pixel in the third row. The correspondence or mapping between the display region 402-*d* and the touch region 404-*d* is symbolically illustrated by arrow 406-*d* and between the display region 402-*d* and the touch region 404-*e* by arrow 406-*e*.

In some embodiments, one display region can be used to compensate for crosstalk in one touch region, as illustrated by the display region 402-*a* and the corresponding touch region 404-*a*. In some embodiments, multiple display regions can be used to compensate for crosstalk in one touch region, as illustrated by multiple display regions 402-*b*, 402-*d* and the corresponding touch region 404-*e*. In some embodiments, one display region can be used to compensate for crosstalk in multiple touch regions, as illustrated by the display region 402-*d* and the corresponding multiple touch regions 404-*d*, 404-*e*.

Moreover, in some embodiments where a touch region has multiple pixels, one or more display regions can compensate for crosstalk in each individual pixel of that touch region, as illustrated by the display region 402-*d* compensating for crosstalk in each pixel 424 in the touch region 404-*d*. In some embodiments where a touch region has a single pixel, multiple display regions can compensate for crosstalk in that pixel, as illustrated by the display regions 402-*b*, 402-*d* both compensating for crosstalk in the single pixel 424 in touch region 404-*e*.

It is to be understood that the correspondence illustrated in FIG. 4 is only a partial example. Multiple different correspondences of display and touch pixels can be accomplished according to the needs of the touch sensitive device and the crosstalk effects associated therewith.

Referring again to FIG. 3, the downsampler 320 can include row accumulator 322, column accumulator 324, and shift register 326. The row accumulator 322 can downsample multiple rows in each predetermined display region into a single row to correspond to a predetermined touch pixel or few touch pixels in the touch image. For example, a display region of 50×50 pixels can be downsampled into a single row of 50 columns corresponding to a touch pixel in row 0 of the touch image. Exemplary downsampling methods for the row accumulator will be described in FIGS. 5 and 6 below. The column accumulator 324 can downsample multiple columns in each of the predetermined, row-downsampled display regions into a single column to correspond to the predetermined touch pixel or few touch pixels in the touch image. For example, the downsampled single row of 50 columns of display pixels can be further downsampled into a single display pixel corresponding to the touch pixel in row 0 of the touch image. Exemplary downsampling methods for the column accumulator will be described in FIGS. 5 and 6 below. The shift register 326 can optionally truncate each row-, column-downsampled display pixel into a single byte value, for example, for ease of encoding and transmission.

It is to be understood that the downsampler of FIG. 3 is not limited to the components shown, but can include additional and/or other components for downsampling an image according to various embodiments.

Figure 5:
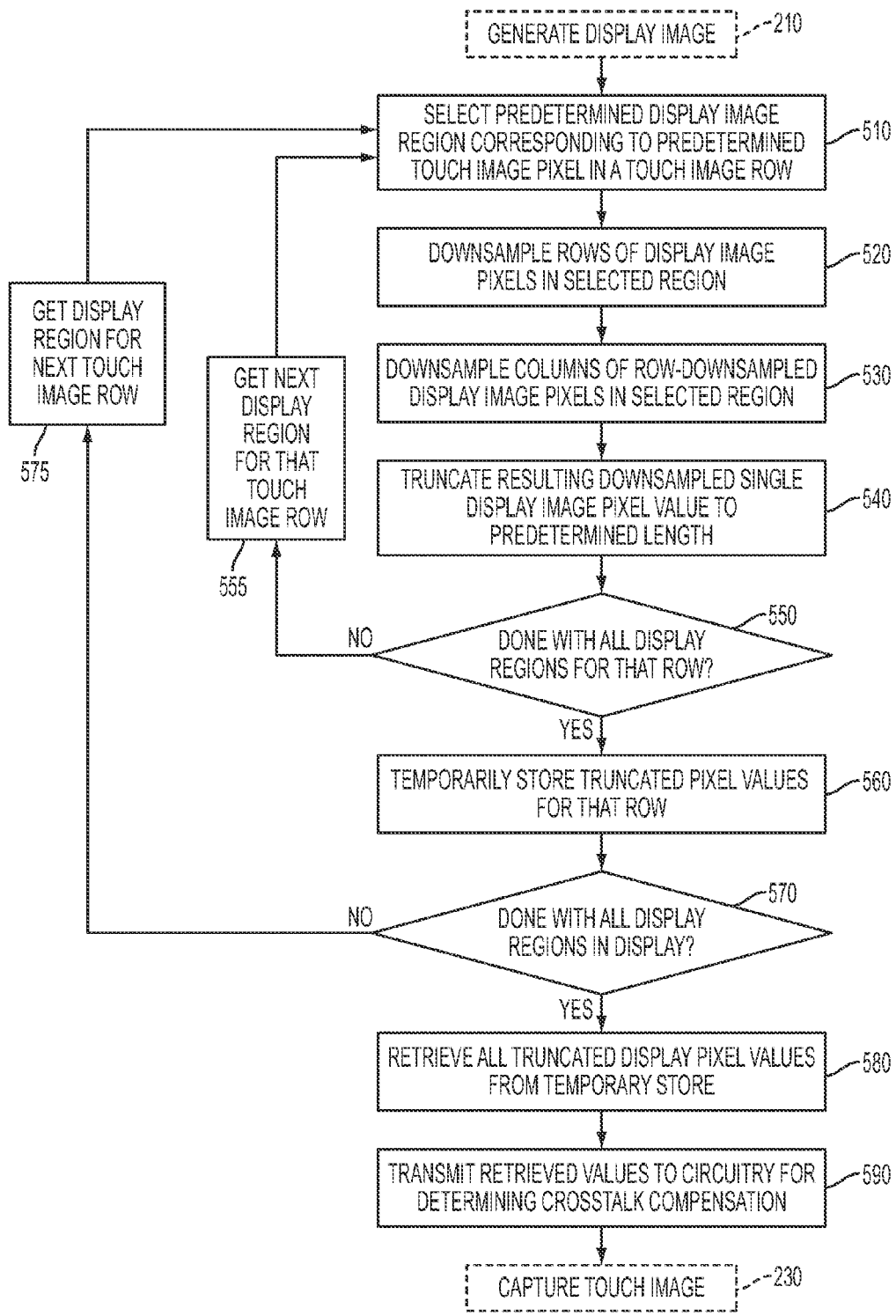
FIG. 5 illustrates an exemplary method of compensating for crosstalk in a touch sensitive device, such as in FIG. 3, according to various embodiments.

FIG. 5 illustrates an exemplary method of downsampling a display image in preparation for crosstalk compensation in a touch image according to various embodiments. This method can be used in the downsampler of FIG. 3, for example. This method can also be used as part of the downsampling (220) of FIG. 2, for example. In the example of FIG. 5, a display image can be generated at a display (210). In the display image, a selection can be made of a predetermined region of display pixels corresponding to a predetermined touch pixel (or small group of touch pixels) in a row of a touch image susceptible to crosstalk (510). For example, a region of display pixels corresponding to a predetermined touch drive region, guard region, or sense region of touch pixel(s) can be selected. Although the display regions and the corresponding touch pixels are predetermined, it is to be understood that they can alternatively be dynamically determined. The rows of display pixels in the predetermined region can be downsampled into a single row by averaging the rows of pixels together (520). For example, suppose the predetermined region has an array of m×n pixels. The pixels in the first position in each of the m rows can be averaged together, followed by the pixels in the second position in each of the m rows, and so on through the pixels in the n-th position in each of the m rows. As a result, the row-downsampled region has a single row of n pixels, where each row entry is an average of m pixels. Alternatively, the rows of display pixels can be downsampled by determining a median, or some other suitable metric, of the pixels. The columns of the row-downsampled display pixels in the predetermined region can be further downsampled into a single display pixel by averaging the columns of pixels together (530). For example, after column-downsampling, the row-downsampled region of a single row of n pixels now has a single pixel, which is an average of n pixels. Alternatively, the columns of display pixels can be downsampled by determining a median, or some other suitable metric, of the pixels. The single pixel value can be truncated into a single byte value for ease of transmission (540).

A determination can be made as to whether all the predetermined regions of display pixels corresponding to the predetermined touch pixels in the row of the touch image have been downsampled (550). If not, another of the predetermined regions can be selected (510), the display pixels in that selected region can be row-downsampled (520) and column-downsampled (530), and the downsampled display pixel can be truncated (540). This determination (550) and subsequent actions (510-540) can be repeated (555) until all the predetermined regions corresponding to the first row of the touch image have been downsampled, after which time the truncated display pixel values for the row of touch pixels can then be stored until ready for transmission to circuitry performing the touch pixel crosstalk compensation. (560)

A determination can then be made as to whether all the predetermined regions in the display image have been downsampled (570). If not, another touch image row can be targeted and the predetermined regions of display pixels corresponding to the predetermined touch pixels in that targeted row can be downsampled. That is, a predetermined region of display pixels corresponding to a predetermined touch pixel (or a small group of pixels) in that row of the touch image can be selected (510), the display pixels in that selected region can be row-downsampled (520) and column-downsampled (530), and the downsampled display pixel can be truncated (540). These actions (510-550) can be repeated (555) until all the predetermined regions corresponding to that row of the touch image have been downsampled. The truncated display pixel values for that row of touch pixels can then be stored along with previously processed values until ready for transmission (560). This determination (570) and subsequent actions (510-560) can be repeated (575) for all the predetermined regions in the display image.

When the downsampled display image is ready for transmission, the pixel values can be retrieved from storage (580). The retrieved pixel values can then be transmitted to the circuitry performing the touch pixel crosstalk compensation (590). The touch image upon which the compensation will be performed can be captured (230).

Figure 6:
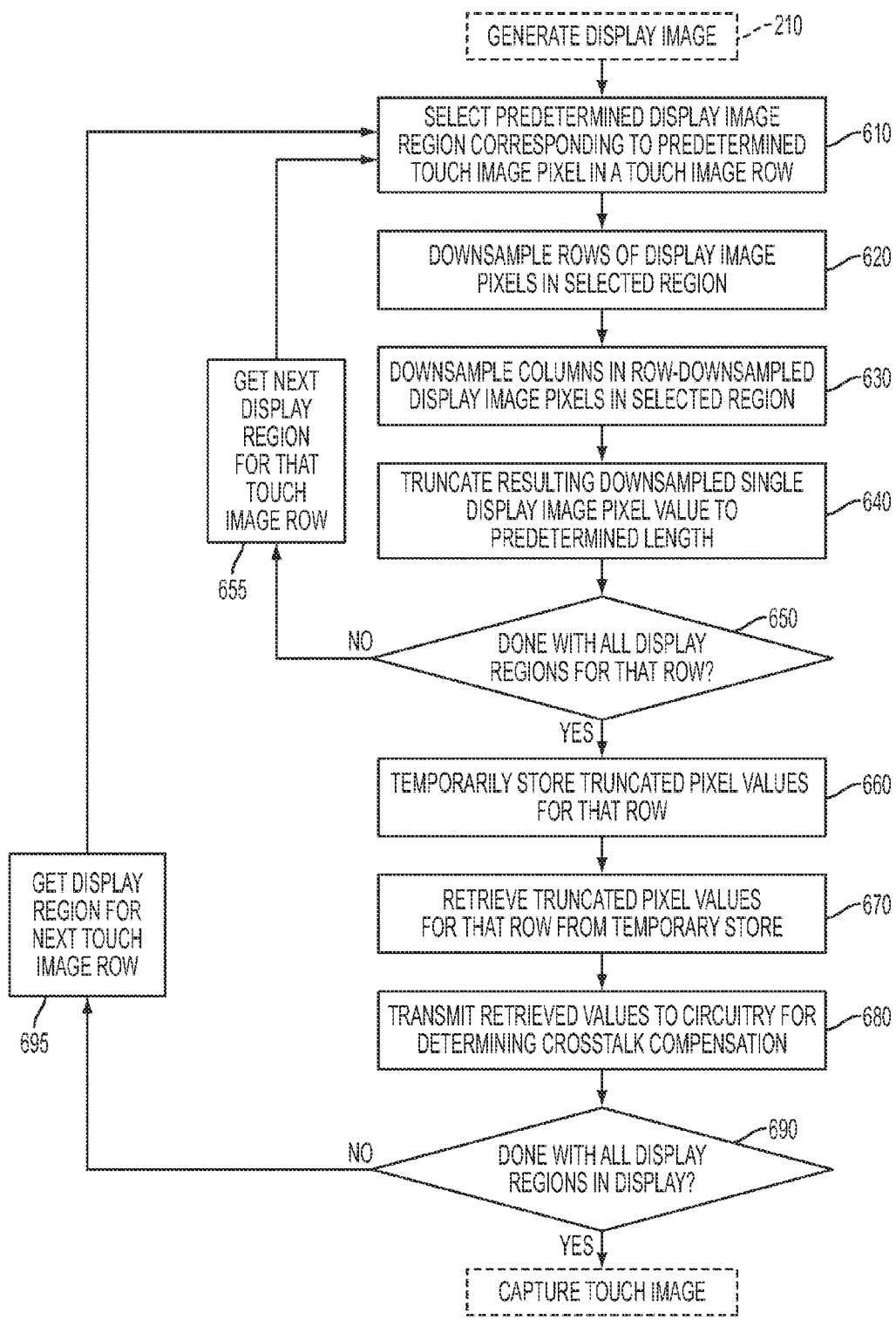
FIG. 6 illustrates another exemplary method of compensating for crosstalk in a touch sensitive device, such as in FIG. 3, according to various embodiments.

FIG. 6 illustrates another exemplary method of downsampling a display image in preparation for crosstalk compensation in a touch image according to various embodiments. This method can also be used in the downsampler of FIG. 3, for example. This method can also be used as part of the downsampling (220) of FIG. 2, for example. This method is the same as the method of FIG. 5 except that the truncated display pixel values can be transmitted after the predetermined display regions for each corresponding touch image row have been downsampled. This is in contrast to the method of FIG. 5, where the transmission of the truncated display pixel values can be deferred until all the predetermined display regions corresponding to all the touch image rows have been downsampled. The method of FIG. 6 increases the number of transmissions per display image, but decreases the number of bytes per transmission compared to the method of FIG. 5.

In the example of FIG. 6, a display image can be generated at a display (210). In the display image, a selection can be made of a predetermined region of display pixels corresponding to a predetermined touch pixel (or small group of touch pixels) in a row of a touch image susceptible to crosstalk (610). For example, a predetermined region of display pixels corresponding to a predetermined touch drive region, guard region, or sense region of touch pixel(s) can be selected. Although the display regions and the corresponding touch pixels are predetermined, it is to be understood that they can alternatively be dynamically determined. The rows of display pixels in the predetermined region can be downsampled into a single row by averaging the rows of pixels together (620). Alternatively, the rows of display pixels can be downsampled by determining a median, or some other suitable metric, of the pixels. The columns of the row-downsampled display pixels in the predetermined region can be further downsampled into a single display pixel by averaging the columns of pixels together (630). Alternatively, the columns of display pixels can be downsampled by determining a median, or some other suitable metric, of the pixels. The single pixel value can be truncated into a single byte value for ease of transmission (640).

A determination can be made as to whether all the predetermined regions of display pixels corresponding to the predetermined touch pixels in the row of the touch image have been downsampled (650). If not, another of the predetermined regions can be selected (610), the display pixels in that selected region can be row-downsampled (620) and column-downsampled (630), and the downsampled display pixel can be truncated (640). This can be repeated (655) until all the predetermined regions corresponding to the first row of the touch image have been downsampled, after which time the truncated display pixel values for the row of touch pixels can then be stored until time for transmission to circuitry performing the touch pixel crosstalk compensation. (660)

When the truncated display pixel values are ready for transmission, the pixel values can be retrieved from storage (670). The retrieved pixel values can then be transmitted to the circuitry performing the touch pixel crosstalk compensation (680).

A determination can then be made as to whether all the predetermined regions in the display image have been downsampled (690). If not, another touch image row can be targeted and the predetermined regions of display pixels corresponding to the predetermined touch pixels in that targeted row can be downsampled. That is, a predetermined region of display pixels corresponding to a predetermined touch pixel (or small group of touch pixels) in that row of the touch image can be selected (610), the display pixels in that selected region can be row-downsampled (620) and column-downsampled (630), and the downsampled display pixel can be truncated (640). These actions (610-650) can be repeated (655) until all the predetermined regions corresponding to that row of the touch image have been downsampled. The truncated display pixel values for that row of touch pixels can then be stored until time for transmission (660). When it is time for transmission, the pixel values can be retrieved from storage (670) and transmitted to the circuitry performing the touch pixel crosstalk compensation (680). This determination (690) and subsequent actions (610-680) can be repeated (695) for all the predetermined regions in the display image.

The touch image upon which the compensation will be performed can be captured (230).

It is to be understood that methods for image downsampling are not limited to those illustrated in FIGS. 5 and 6, but can include additional and/or other actions for performing downsampling according to various embodiments.

Figure 7:
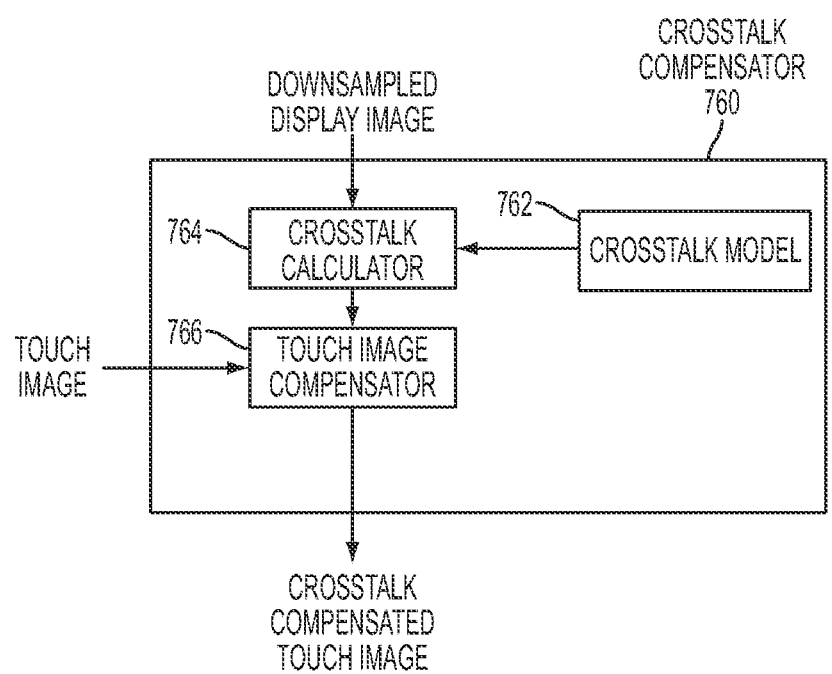
FIG. 7 illustrates an exemplary touch sensitive device crosstalk compensator having crosstalk compensation circuitry according to various embodiments.

FIG. 7 illustrates an exemplary crosstalk compensator of a touch sensitive device having crosstalk compensation circuitry according to various embodiments. In the example of FIG. 7, crosstalk compensator 760 can use information about a display image to compensate a touch image for crosstalk present between a display and a touch sensor panel. The crosstalk compensator 760 can include crosstalk model 762, crosstalk calculator 764, and touch image compensator 766. The crosstalk model 762 can determine the expected crosstalk in a touch image as a function of a display image for the particular display and touch sensor panel in this touch sensitive device. The model can be formulated from empirical information regarding the interaction between the display and touch sensor panel in the touch sensitive device. This empirical information can be determined by comparing touch signals generated during operation of both the display and panel with touch signals generated during operation of only the panel. In some embodiments, the model can be static during crosstalk compensation. In some embodiments, the model can be dynamic during crosstalk compensation, having model parameters that can be adjusted based on certain operational and environmental conditions of the touch sensitive device.

The crosstalk calculator 764 can calculate the expected amount of crosstalk by applying the downsampled display image to the crosstalk model. In some embodiments, the output from the crosstalk calculator 764 can be a crosstalk image having the same dimensions as the touch image with pixel values representative of the expected amount of crosstalk in the corresponding touch image pixels or pixel values representative of compensation factors to be applied to the corresponding touch image pixels. In some embodiments, the output from the crosstalk calculator 764 can be a crosstalk lookup table (LUT) having table entries of touch image pixel coordinates with corresponding expected crosstalk amounts or compensation factors. In some embodiments, the output of the crosstalk calculator 764 can be a single value representative of the expected (aggregate or average) amount of crosstalk in the touch image or a single value representing a compensation factor to be applied to all or portions of the touch image.

The touch image compensator 766 can substantially reduce or eliminate the crosstalk in the captured touch image by applying the crosstalk value(s) from the crosstalk calculator 764 to the touch image. In some embodiments, the compensator 766 can subtract the crosstalk value(s) from the touch image. For example, the compensator can subtract each crosstalk image pixel value from its corresponding touch image pixel value. Alternatively, the compensator can retrieve a crosstalk value from a LUT according to the touch image pixel coordinates and subtract that retrieved value from the corresponding touch image pixel value. Alternatively, the compensator 766 can add the crosstalk value(s) to the touch image, depending on how the crosstalk value(s) are calculated, for example. In some embodiments, the compensator 766 can multiply the touch image by the crosstalk value(s) representing compensation factor(s). For example, the compensator can multiply each crosstalk image pixel value and its corresponding touch image pixel value or the compensator can multiply a single compensation value and particular touch image pixel values determined to be more susceptible to crosstalk. Alternatively, the compensator 766 can divide the touch image by the crosstalk value(s) representing compensation factor(s), depending on how the crosstalk value(s) are calculated, for example. The compensator 766 can output a crosstalk compensated touch image with substantially reduced or eliminated crosstalk.

It is to be understood that the crosstalk compensator of FIG. 7 is not limited to the components shown, but can include additional and/or other components for crosstalk compensating an image according to various embodiments.

Figure 8:
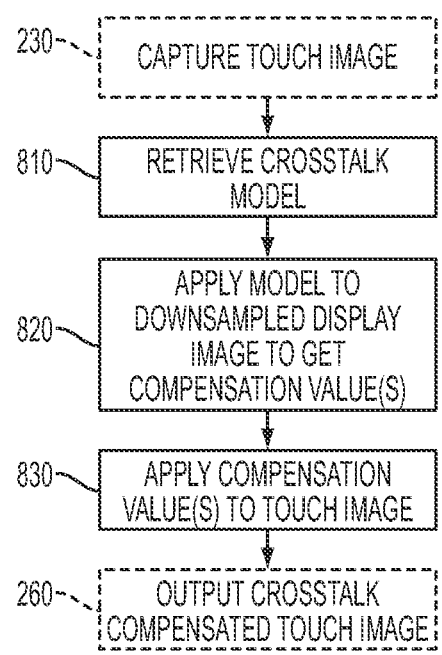
FIG. 8 illustrates an exemplary method of compensating for crosstalk in a touch sensitive device, such as in FIG. 7, according to various embodiments.

FIG. 8 illustrates an exemplary method of compensating a touch image for crosstalk according to various embodiments. This method can be used in the crosstalk compensator of FIG. 7, for example. This method can also be used as part of the crosstalk calculation (240) and the crosstalk value(s) application (250) of FIG. 2, for example. In the example of FIG. 8, a touch image can be captured at a touch sensor panel, the touch image being indicative of a touch or hover at the panel (230). A crosstalk model can be retrieved from storage for modeling the expected amount of crosstalk in a touch image from the panel as a function of a display image from a display, given either the observed or theoretical interaction between the display and the panel (810). The model can be applied to a downsampled display image to calculate crosstalk compensation value(s) (820). In some embodiments, the compensation value(s) can be the expected amount of crosstalk in the touch image. In some embodiments, the compensation value(s) can be compensation factors to be applied to the touch image. The compensation value(s) can be in the form of a crosstalk image, each crosstalk image pixel to be applied to a corresponding touch image pixel. Alternatively, the compensation value(s) can be in a LUT with corresponding touch pixel coordinates to which the value(s) should be applied. Alternatively, the compensation value can be a single value to apply to some or all of the touch image pixels. Other forms of the compensation value(s) are also possible according to the needs of the touch sensitive device. The crosstalk compensation value(s) can be applied to the captured touch image (830). In some embodiments, the value(s) can be either added to or subtracted from the touch image values. In some embodiments, the touch image values can be either multiplied to or divided by the compensation value(s). The resulting crosstalk compensated touch image can be outputted to cause some action of the touch sensitive device (260).

It is to be understood that methods for crosstalk compensation are not limited to that illustrated in FIG. 8, but can include additional and/or other actions for performing crosstalk compensation according to various embodiments.

Figure 9:
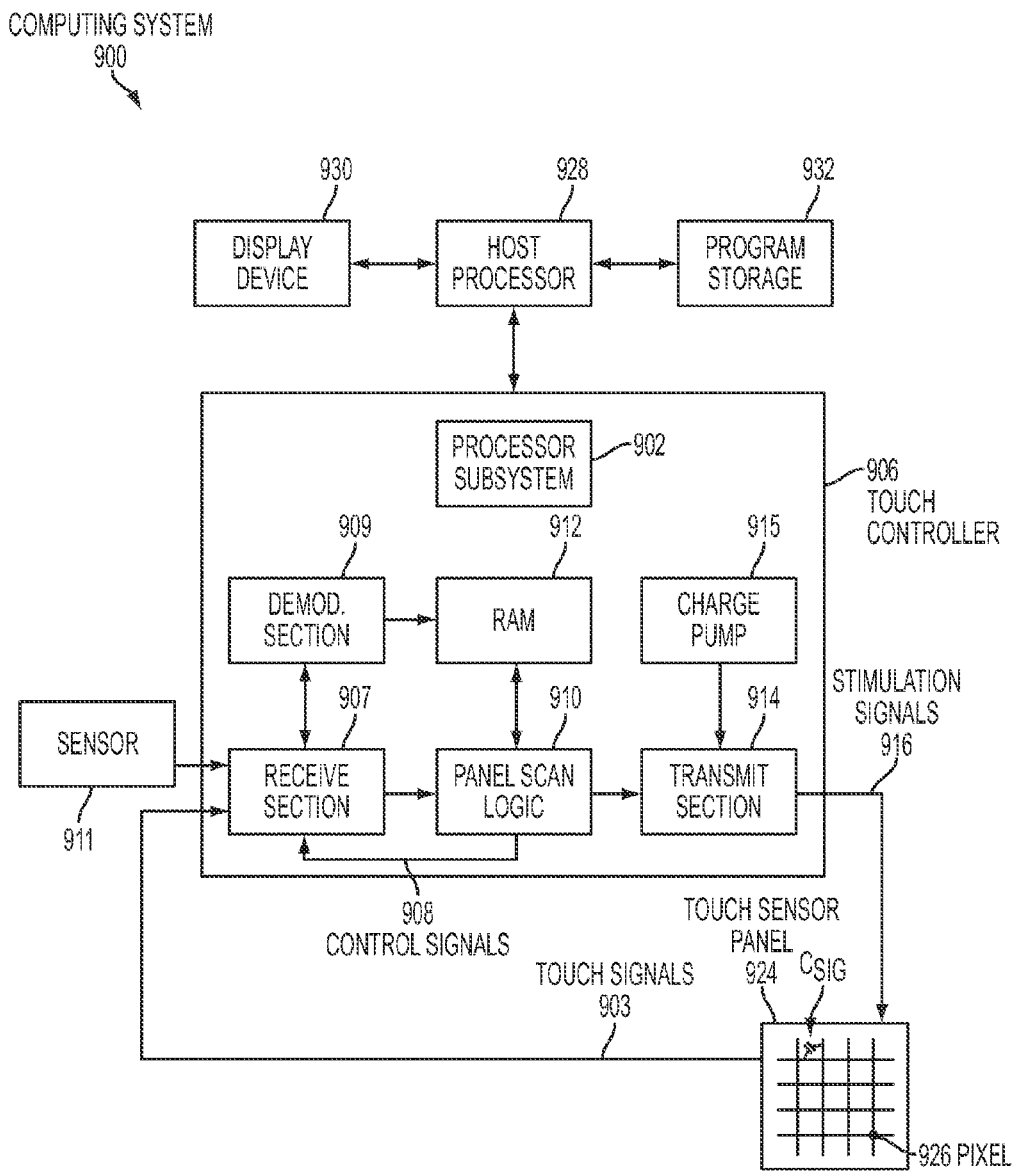
FIG. 9 illustrates an exemplary computing system having a touch sensitive device with crosstalk compensation circuitry according to various embodiments.

FIG. 9 illustrates an exemplary computing system 900 that can compensate for crosstalk between a display and a touch sensor panel according to various embodiments described herein. In the example of FIG. 9, computing system 900 can include touch controller 906. The touch controller 906 can be a single application specific integrated circuit (ASIC) that can include one or more processor subsystems 902, which can include one or more main processors, such as ARM968 processors or other processors with similar functionality and capabilities. However, in other embodiments, the processor functionality can be implemented instead by dedicated logic, such as a state machine. The processor subsystems 902 can also include peripherals (not shown) such as random access memory (RAM) or other types of memory or storage, watchdog timers and the like. The touch controller 906 can also include receive section 907 for receiving signals, such as touch signals 903 of one or more sense channels (not shown), other signals from other sensors such as sensor 911, etc. The touch controller 906 can also include demodulation section 909 such as a multistage vector demodulation engine, panel scan logic 910, and transmit section 914 for transmitting stimulation signals 916 to touch sensor panel 924 to drive the panel. The panel scan logic 910 can access RAM 912, autonomously read data from the sense channels, and provide control for the sense channels. In addition, the panel scan logic 910 can control the transmit section 914 to generate the stimulation signals 916 at various frequencies and phases that can be selectively applied to rows of the touch sensor panel 924.

The touch controller 906 can also include charge pump 915, which can be used to generate the supply voltage for the transmit section 914. The stimulation signals 916 can have amplitudes higher than the maximum voltage by cascading two charge store devices, e.g., capacitors, together to form the charge pump 915. Therefore, the stimulus voltage can be higher (e.g., 6V) than the voltage level a single capacitor can handle (e.g., 3.6 V). Although FIG. 9 shows the charge pump 915 separate from the transmit section 914, the charge pump can be part of the transmit section.

Computing system 900 can also include touch sensor panel 924 and a display 930, which can be as described above in FIG. 1, for example.

Computing system 900 can include host processor 928 for receiving outputs from the processor subsystems 902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 928 can also perform additional functions that may not be related to panel processing, and can be coupled to program storage 932 and display device 930 such as an LCD display for providing a UI to a user of the device. In some embodiments, the host processor 928 can be a separate component from the touch controller 906, as shown. In other embodiments, the host processor 928 can be included as part of the touch controller 906. In still other embodiments, the functions of the host processor 928 can be performed by the processor subsystem 902 and/or distributed among other components of the touch controller 906. The display device 930 together with the touch sensor panel 924, when located partially or entirely under the touch sensor panel or when integrated with the touch sensor panel, can form a touch sensitive device such as a touch sensitive device.

Note that crosstalk compensation, as well as one or more of the functions described above, can be performed, for example, by firmware stored in memory (e.g., one of the peripherals) and executed by the processor subsystem 902, or stored in the program storage 932 and executed by the host processor 928. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system is not limited to the components and configuration of FIG. 9, but can include other and/or additional components in various configurations capable of compensating for crosstalk according to various embodiments.

Figure 10:
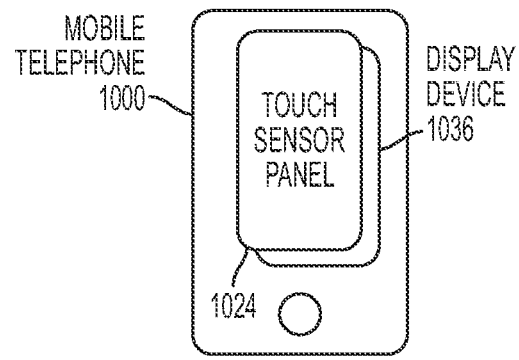
FIG. 10 illustrates an exemplary mobile telephone having a touch sensitive device with crosstalk compensation circuitry according to various embodiments.

FIG. 10 illustrates an exemplary mobile telephone 1000 that can include touch sensor panel 1024, display 1036, and other computing system blocks that can perform crosstalk compensation according to various embodiments.

Figure 11:
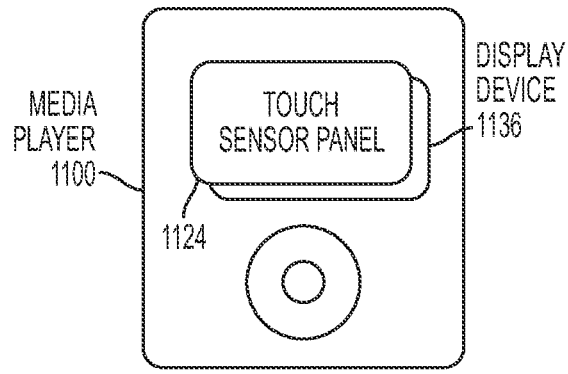
FIG. 11 illustrates an exemplary digital media player having a touch sensitive device with crosstalk compensation circuitry according to various embodiments.

FIG. 11 illustrates an exemplary digital media player 1100 that can include touch sensor panel 1124, display 1136, and other computing system blocks that can perform crosstalk compensation according to various embodiments.

Figure 12:
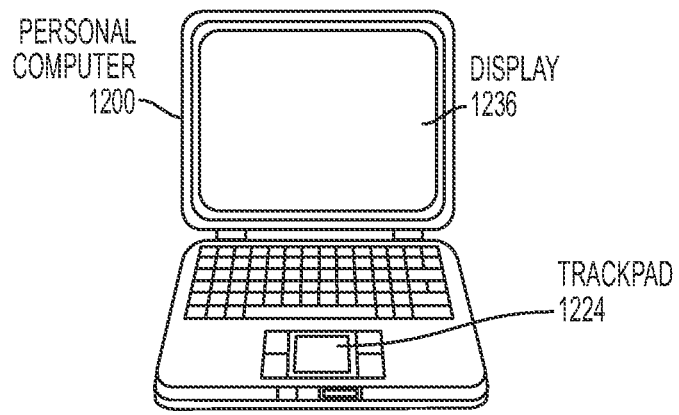
FIG. 12 illustrates an exemplary personal computer having a touch sensitive device with crosstalk compensation circuitry according to various embodiments.

FIG. 12 illustrates an exemplary personal computer 1200 that can include touch sensor panel (trackpad) 1224, display 1236, and other computing system blocks that can perform crosstalk compensation according to various embodiments.

The mobile telephone, media player, and personal computer of FIGS. 10 through 12 can realize improved touch and hover sensing by compensating for crosstalk according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch sensitive device comprising:
   a display configured to show a display image;
   a touch sensor panel configured to capture a touch image; and
   logic configured to
      downsample the display image,
      generate a plurality of compensation values based on the downsampled display image, each of the plurality of compensation values being representative of crosstalk in a corresponding plurality of touch pixels in the captured touch image, and
      apply the plurality of compensation values to the captured touch image to compensate the captured touch image for the crosstalk,
      wherein the compensated touch image is indicative of an amount of touch or hover.

2. The device of claim 1, wherein the logic comprises a downsampler configured to downsample the display image to a size at least as small as a size of the captured touch image.

3. The device of claim 1, wherein downsampling the display image comprises selectively sampling the display image to provide portions therefrom that are indicative of the crosstalk.

4. The device of claim 1, wherein applying the plurality of compensation values comprises selectively applying one or more of the plurality of compensation values to portions of the captured touch image determined to having the crosstalk.

5. The device of claim 1, comprising:
   a memory configured to periodically store the plurality of compensation values prior to the applying.

6. The device of claim 1 incorporated into at least one of a mobile phone, a digital media player, or a computer.

7. A method of compensating for crosstalk in a touch sensitive device, the method comprising:
   generating a display image and a touch image;
   downsampling the display image;
   estimating a plurality of compensation values based on the downsampled image, each of the plurality of compensation values being representative of crosstalk in a corresponding plurality of touch pixels in the touch image; and
   adjusting the touch image based on the plurality of compensation values to compensate for the crosstalk, wherein the adjusted touch image is indicative of an amount of touch or hover.

8. The method of claim 7, wherein downsampling the display image comprises:
   selecting predetermined portions of the display image indicative of the crosstalk;
   downsampling the rows of the selected portions to form row-downsampled portions;
   downsampling the columns of the row-downsampled portions to form single values for the selected portions; and
   outputting the single values for the estimating.

9. The method of claim 8, wherein outputting the single values comprises outputting either a group of the single values or all of the single values at a time for the display image.

10. The method of claim 7, wherein estimating an amount of crosstalk comprises:
    applying a crosstalk model to the downsampled image, the model correlating crosstalk amounts with display image values; and
    outputting the estimated amount of crosstalk from the model.

11. The method of claim 7, wherein adjusting the touch image comprises subtracting the estimated amount of crosstalk from the touch image.

12. A touch sensitive device comprising:
a touch sensor panel configured to capture an image indicative of a touch or hover at the panel; and
a crosstalk compensator configured to
input information indicative of crosstalk at the panel,
calculate a compensation factor based on the inputted information, and
apply the compensation factor to the captured image to compensate for the crosstalk, wherein the compensated image is indicative of an amount of touch or hover;
wherein the crosstalk compensator comprises a crosstalk image calculator configured to calculate the compensation factor, the compensation factor being a crosstalk image, each pixel in the crosstalk image representative of the crosstalk in a corresponding plurality of touch pixels in the captured image.

13. The device of claim 12, wherein the crosstalk compensator comprises a crosstalk model configured to correlate crosstalk amounts with the inputted information.

14. The device of claim 12, wherein the crosstalk compensator comprises an image compensator configured to apply the compensation factor to the captured image, each pixel value in the crosstalk image being applied to the corresponding pixel value in the captured image.

15. The device of claim 12, wherein the compensator selects portions of the captured image to compensate for the crosstalk, the selected portions experiencing substantial crosstalk.

16. A method of compensating for crosstalk in a touch sensitive device, the method comprising:
mapping display pixels to touch pixels experiencing crosstalk;
capturing a display image from the mapped display pixels;
downsampling the display image;
calculating a plurality of compensation values based on the downsampled display image, each of the plurality of compensation values being representative of crosstalk in a corresponding plurality of touch pixels in the captured touch image;
capturing a touch image from the mapped touch pixels; and
applying the plurality of compensation values to the captured touch image to compensate for the crosstalk, wherein the compensated touch image is indicative of an amount of touch or hover.

17. The method of claim 16, wherein the mapping comprises mapping multiple rows of display pixels to a corresponding row of touch pixels.

18. The method of claim 16, wherein the mapping comprises mapping selective groups of display pixels to selective groups of touch pixels proximate to the selected groups of display pixels.

* * * * *